United States Patent [19]

Moriya et al.

[11] 4,245,327
[45] Jan. 13, 1981

[54] DATA PROCESSOR HAVING TWO TYPES OF CARRY FLAGS

[75] Inventors: Yoshiaki Moriya, Inagi; Ichiro Kobayashi, Kawasaki; Yukio Kitagawa, Yokohama, all of Japan

[73] Assignee: Tokyo Shibaura Denki Kabushiki Kaisha, Japan

[21] Appl. No.: 17,617

[22] Filed: Mar. 5, 1979

[30] Foreign Application Priority Data

Mar. 6, 1978 [JP] Japan .................................. 53-25281

[51] Int. Cl.³ ............................................... G06F 7/50
[52] U.S. Cl. ................................... 364/768; 364/782; 364/785
[58] Field of Search ............... 364/768, 715, 782, 785, 364/786, 200, 900

[56] References Cited

U.S. PATENT DOCUMENTS

| | | | |
|---|---|---|---|
| 3,939,335 | 2/1976 | Brantingham et al. | 364/900 |
| 3,956,620 | 5/1976 | Brantingham et al. | 364/786 X |
| 4,037,090 | 7/1977 | Raymond, Jr. | 364/200 X |
| 4,125,867 | 11/1978 | Cochran | 364/781 X |

OTHER PUBLICATIONS

TMS 1000 Series MOS/LST One-Chip Microcomputers, Programmer's Reference Manual, Texas Instruments Asia Limited, p. 1-6 & p. 12-2.
P.P.S. 411 Single Circuit Microcomputer Series, Programming Manual, Rockwell International, p. 1-2 & p. 3-33.

*Primary Examiner*—David H. Malzahn
*Attorney, Agent, or Firm*—Finnegan, Henderson, Farabow, Garrett & Dunner

[57] ABSTRACT

Two flip-flops for carry information are provided in a data processor; one for carry of arithmetic operation and the other for carry occurring when a program counter is incremented. A state of the latter flip-flop provides a condition of a conditional branch instruction. With the provision of those flip-flops, a multidigit operation can be performed without increasing program-steps to save carry information attendant on the operation data. A simple program may be prepared without increasing hardware for skip instruction processing.

2 Claims, 5 Drawing Figures

DATA PROCESSOR HAVING TWO TYPES OF CARRY FLAGS

BACKGROUND OF THE INVENTION

1. Field of the Invention

The invention relates to a data processor for processing programs.

2. Background of the Invention

In case where programs for arithmetic operation over multi-digit (multi-word) are executed by using a data processor for processing programs, the complexity of the hardware and the programs is determined depending on how to process the carry information in the arithmetic operation and the information to branch off from an arithmetic processing loop in a program. In a conventional computer, a single flip-flop is commonly used as a flag for holding carry information and for storing the respective information mentioned above. At a time that the information to branch off from the arithmetic operation processing loop is obtained, the carry information is saved in some manner or the branch-off information is used to judge whether the next instruction is to be skipped or not. The use of a skip instruction eliminates the need for the saving of the carry information.

Figure 2:
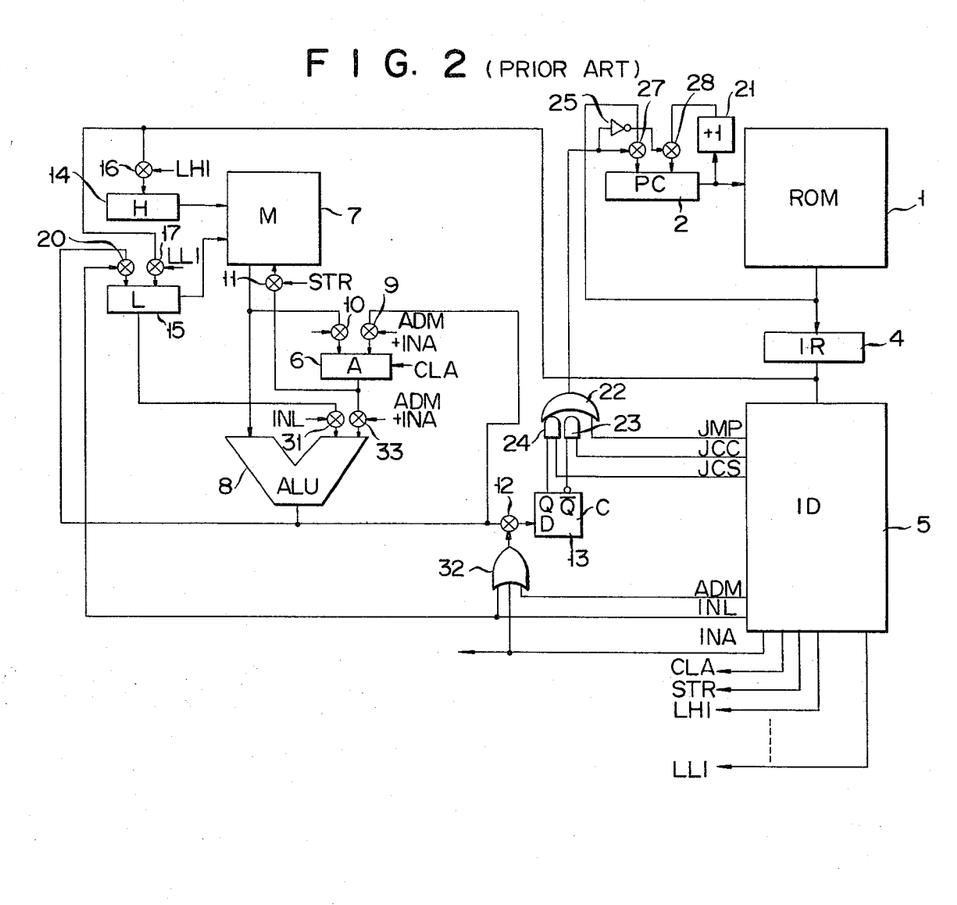
FIG. 2 shows a block diagram of another example of a conventional processor in which the L register is incremented by the ALU and carry information of the increment and carry information of an arithmetic operation are together stored in a single flip-flop.
Figure 3:
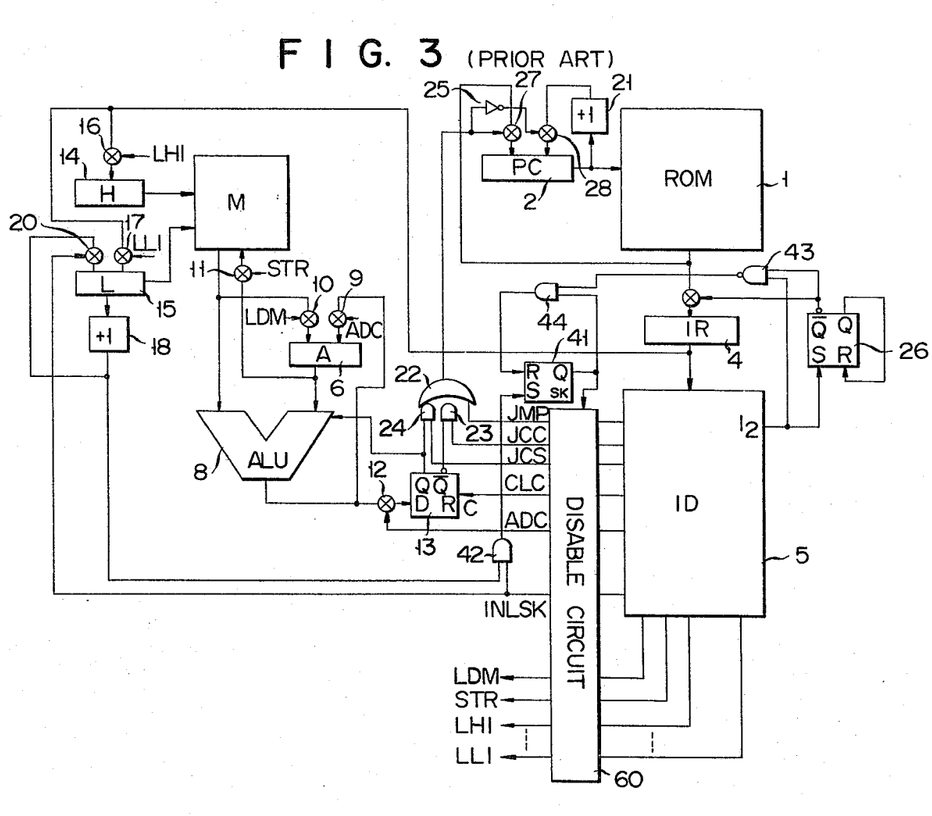
FIG. 3 shows a block diagram of still another example of a conventional data processor in which the L register is incremented by an incrementer and carry information outputted from said incrementer is stored in a first flip-flop and carry information outputted from the ALU is stored in a second flip-flop.

The former type computer, which uses the additional instruction for saving the carry information, suffers from increased program size because of such an additional instruction. The latter type computer needs additional hardware to execute the skip instruction, thus having economical and control problems because of the additional hardware. This will be described in detail with reference to FIGS. 1 to 3 illustrating conventional data processors.

Figure 1:
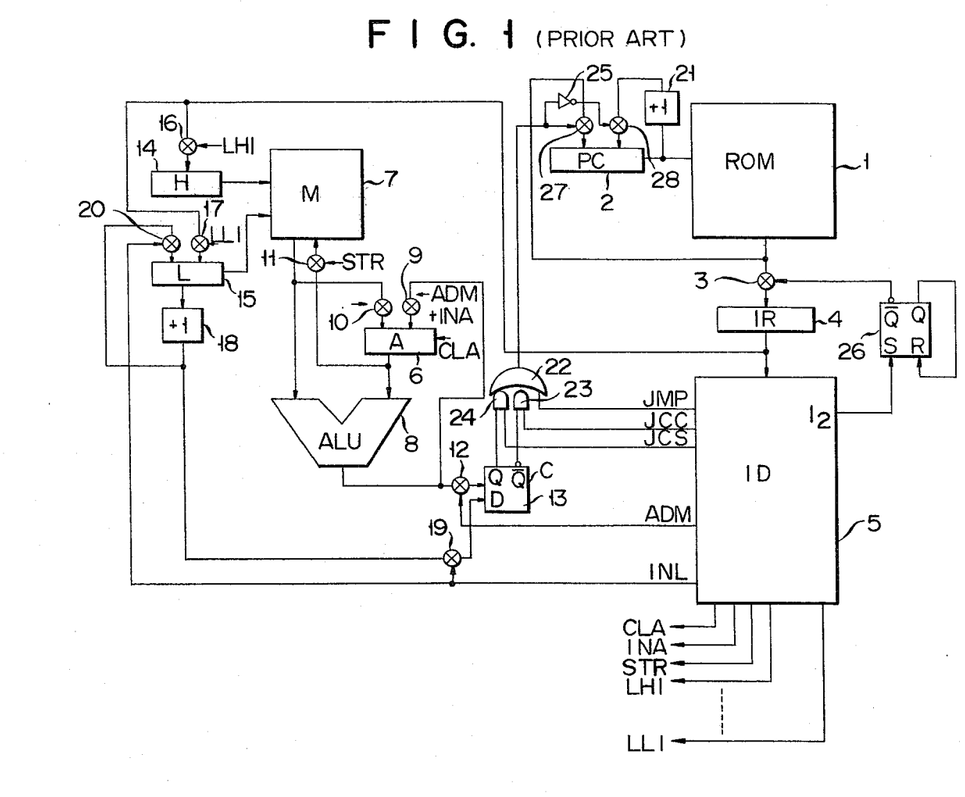
FIG. 1 shows a block diagram of an example of a conventional data processor in which an L register is incremented by an incrementer and carry information of the increment and carry information of an arithmetic operation outputted from an arithmetic and logic unit are together stored in a single flip-flop.

In FIG. 1, a memory 1 stores programs (often including data) and is addressed by a program counter 2 (PC). An instruction in the memory 1 specified by the counter 2 is transferred through a gate 3 to an instruction register (IR) 4. The instruction transferred to the register 4 is decoded by an instruction decoder (ID) 5 to produce various kinds of control signals. The signal lines carrying these control signals and denoted by symbols for instructions are activated only when receiving the corresponding instructions.

Further, the computer shown in FIG. 1 includes an accumulator (A) 6 for performing proper processing such as operations, and a memory (M) 7 for storing only data. Those units are both connected to an arithmetic and logic unit (ALU) 8 to permit data transfer therebetween for operation. The output signal of the ALU 8 returns through a gate 9 to the accumulator 6. The output signal of the memory 7 may be applied through a gate 10 to the accumulator 6 and the output signal of the accumulator 6 may be applied through a gate 11 to the memory 7 for storage. The carry information which is part of the operation result from the arithmetic and logic unit 8 is stored in a D-type flip-flop (C) 13 which is a flag register of one bit, through a gate 12. Upon receipt of an instruction (ADM instruction) for arithmetically summing the output signals of the memory 7 and the accumulator 6, which is one of the standard instructions, the gate 12 is enabled and at this time the gate 9 also enabled.

In addressing the memory 7, the page of the memory is specified by a register (H) 14 and the address in the page by a registers (L) 15. To the H and L register 14 and 15, immediate data may be transferred from the instruction register 4, through gates 16 and 17. The transfer instructions used at this time are designated by LHI and LLI. An incrementer 18 provided in the L register 15 increments by 1 the contents of the L register 15, i.e. adds +1 to the contents, so as to address a plurality of words continuously arranged in the memory 7. The output of the incrementer 18 is transferred to the flip-flop 13 and the L register 15, through gates 19 and 20 which are enabled when they receive an instruction (INL instruction) to increment the contents of the L register 15.

Similarly, the program counter 2 is provided with an incrementer 21 for adding +1 to the contents of the program counter 2. The counter 2 is so connected that the contents of it are incremented by 1 by the incrementer 21 or it receives the output signal from the memory 1 in response to the branch instruction. The program counter 2 selects the function from those in dependence of the output signal from an OR gate 22. More specifically, when an unconditional jump instruction (JMP instruction) is issued or a conditional jump instruction (JCC or JCS) is issued and the condition holds, the output signal from the memory 1 is transferred to the program counter 2 through a gate 27. In the case other than the above, the program counter 2 is incremented one by the combination of the incrementer 21 and the gate 28 receiving the output signal from an inverter 25. In connection with the JCC and JCS instructions, the condition for the JCC instruction holds when an AND gate 23 is enabled by the flip-flop 13 being 0 at the output Q. The condition for the JCS instruction holds when an AND gate 24 is enabled by the flip-flop 13 being 1 at the output Q. Incidentally, the JCC instruction jumps if carry is cleared and the JCS instruction jumps if carry is set.

A flip-flop 26 for processing two cycle instructions is set by a signal I2 representing a two-cycle instruction obtained by the instruction decoder 5 and is automatically reset by the succeeding cycle. The output of the flip-flop 26 inhibits the transfer of the second word of the two-cycle instruction from the memory 1 to the instruction register 4. The two-cycle instruction used here means a two-byte instruction such as a JUMP instruction or a subroutine call instruction.

One of the constructions mentioned above is a MOS/LSI one chip microcomputer of TMS series manufactured and sold by Texas Instruments Asia Limited. The status logic illustrated on pp 1–6 in TMS 1000 Series MOS/LSI One-Chip Microcomputers, Programmer's Reference Manual, corresponds to the D-type flip-flop 13 shown in FIG. 1. Page 12-2 describes the program of DECIMAL ADDITION and how to process carry information occurring in an arithmetic operation.

Referring now to FIG. 2, there is shown another conventional data processor in which the arithmetic and logic unit 8 increments by +1 the contents of the L register 15 without using the incrementer 18 in FIG. 1. In this case, the output of the L register 15 is applied through the gate 31 to one of the inputs of the ALU 8 when receiving an increment L register (INL) instruction for adding +1 to the L register 15. The output of the ALU 8 returns to the L register 15 through the gate 20. The carry information from the ALU 8 is supplied to the flip-flop 13, through the gate 12. The supply of the carry to the flip-flop 13 is under the control of only the gate 12 coupled with the output of the OR gate 32.

However, since the ADM instruction and the INL instruction are applied to the input of the OR gate 32, the operation of the flip-flop 13 corresponds to that shown in FIG. 1. The gate 33 coupled with the output of the accumulator 6 distinguishes the inputs to the ALU 8 from one another since the output of the L register 15 is also applied to the ALU 8. The INA instruction which is one of the inputs of the OR gate 32 serves to increment by 1 the contents of the A register (increment A register) and therefore there is no need of taking account of this instruction in the description for the operation to be given hereinafter.

Let us consider a case where the L register 15 is constructed by 4 bits and the memory 7 includes 15 words per page, and where eight words (corresponding to an eight-digit numeral) on a zero page and eight words (similarly considerable as an eight-digit numeral) on a one page are summed and the result of the addition is stored in the original one page.

The program prepared in this case is as follows:

| Labels for Addresses | Instructions | Operands | Contents of Instructions |
|---|---|---|---|
| | CLA | | A ← 0 |
| | LLI | 8 | L ← 8 |
| | LHI | 0 | H ← 0 |
| LOOP | ADM | | A ← (A) + (M) <br> C ← 1 if carry occurs <br> C ← 0 if no carry occurs |
| | JCS | CAR | Jump to CAR address if (C) = 1 |
| | LHI | 1 | H ← 1 <br> A ← (A) + (M) <br> C ← 1 if carry occurs <br> C ← 0 if no carry occurs |
| | STR | NOC | M ← (A) |
| | CLA | | A ← 0 |
| | JCC | | Jump to address NOC if (C) = 0 |
| CAR | INA | | A ← (A) + 1, <br> C ← 1 if carry occurs <br> C ← 0 if no carry occurs |
| NOC | INL | | L ← (L) + 1, <br> C ← 1 if carry occurs <br> C ← 0 if no carry occurs |
| | JCC | LOOP | Jump to address LOOP if (C) = C |

-continued

| Labels for Addresses | Instructions | Operands | Contents of Instructions |
|---|---|---|---|

(Note)
1. A: A register L: L register H: H register M: Memory locations designated by H and L registers C: Flip-flop B 2. ( ) indicates the contents of the symbol parenthesized.

In operation of the data processor loaded with such a program, the program counter 2 reads out the CLA instruction from memory an loads it into the instruction register 4, and then the instruction decoder 5 clears the accumulator 6. Then, the LLI instruction is read out and the gate 17 is enabled to load the data corresponding to that stored in the address 8 into the L register 15. Following this, the zero page data is loaded into the H register 14 by the LHI instruction and then the ADM instruction adds the data in the accumulator 6 to the data in the addresses by the registers 14 and 15. If the addition produces a carry, "1" is loaded into the flip-flop 13. If it produces no carry, the contents of the flip-flop 13 is "0". Then, the JCS instruction is executed. If a carry occurs as a result of the addition, the sum of the contents A of the accumulator 6, and the contents M of the memory 7, i.e. (A)+(M) jumps to the address CAR. Carry occurs only when (A) is "1" and (M) is "1" in all bits. At this time, the contents of (A)+(M) is zero and there is no need to add it to the contents of the data in the corresponding address of the one page, because the contents of (A)+(M), is equivalent to that added to the one page. However, the contents of the A of (A)+(M) the first time is "0" so that no carry takes place at this time. The LHI instruction loads the data to specify one page into the H register 14. At this time, the address 8 has been specified by the L register 15. Accordingly, the contents of the address 8 of the zero page is added to the contents of the address 8 under control of the ADM instruction. If carry occurs in the addition, the ADM instruction loads "1" into the flip-flop 13. The succeeding STR instruction loads the result of the addition between the contents in the addresses 8 of both the pages into the address 8 of the one page in the memory 7, from the accumulator 6. Then, the CLA instruction clears the accumulator 6 and the step jumps to the address NOC if "0" is stored in the flip-flop 13 at the next JCC instruction. If "1" is stored in the flip-flop 13, the contents of A+1 (A=0) is stored in the accumulator 6 by the next TNA instruction for preparing the addition of the carry contents "1" in the addition of the next digit. The instruction of INL instruction adds "1" to the contents of the register 15. In this addition, if carry occurs, "1" is loaded into the flip-flop 13. When no carry occurs, "0" is loaded into the flip-flop 13. When "0" is stored in the flip-flop 13, the addition has not yet been completed and therefore the program step jumps to the address LOOP at the next JCC instruction and the addition executing loop repeats until the contents of L+1 has a carry. A carry takes place in the contents of the L+1 when all bits of the contents of L are "1", that is to say, corresponds to the contents of the address 15. Thus, all the additions are complete and the result of the additions has been stored in the corresponding address of one page in the memory 7. In the above-mentioned program, the number of instructions is 13 and a branch instruction is a two-word instruction. The remaining instructions are each one-word instructions. The branch instructions include one JCS instruction and two JCC instructions. The program needs a total of 16 words.

Turning now to FIG. 3, there is shown another example of the conventional data processor with an additional function that, in the instruction for incrementing the contents of the L register 15, if the contents of the L register 15 has a carry, the next instruction is skipped without storing the carry in the flip-flop 13. A flip-flop (SK) 41 judges whether an instruction is skipped or not. When the INLSK instruction, i.e. the contents of the register 15, is incremented by "1" and, as a result, a carry occurs, the flip-flop 41 is set through the AND gate 42 when it receives simultaneously the INLSK instruction and a carry signal delivered from the incrementer 18. If the succeeding instruction is not a two-cycle instruction, the flip-flop 41 is immediately reset after once cycle through the gates 43 and 44. If it is a two-cycle instruction, the SK flip-flop 41 is reset after two cycles. The output Q of the SK flip-flop 41 is applied to a bistable circuit 60 connected to the output side of the instruction decoder 5, in order that none of the instructions is issued from the instruction decoder 5. As a result, the bistable circuit 60 inhibits an unnecessary instruction from being produced from the instruction decoder 5 even if an instruction fetch is performed. In this example, the ADM instruction is slightly modified to be an ADC (ADD with Carry) instruction. In this instruction, when the contents of an output sinal from the memory 7 is added to the contents of the accumulator 6, the contents (1 bit) of the flip-flop 13 is added at the same time. The carry information as a result of the operation is returned to the flip-flop 3 and updates the same. For performing an arithmetic operation by the example in FIG. 3 as in the FIGS. 1 and 2 examples, the following program, for example, is necessary.

```
             CLC            C ← 0
             LLI      8     L ← 8
             LHI      0     H ← 0
→LOOP        LDM            A ← (M)
             LHI      1     H ← 1
             ADC            A ← (A) + (M) + (C)
                            If carry occurs, C ← 1
                            If no carry occurs, C ← 0
       ┌──── STR            M ← (A)
       │     INLSK          L ← (L) + 1, If
       │                    carry occurs,
       │                    skip the next instruction
             JMP    LOOP    Jump to address LOOP
```

The feature of the program resides in that the flip-flop 13 is used only for data addition and is not used for storing the carry information transferred from the L register 15. The number of the instructions in the program is 10 in total; nine one-word instructions and one two-word instruction for the branch instruction. The number of the instructions in this example is much less than those of the programs in the FIGS. 1 and 2 examples. However, this example needs much hardware, although the program amount is lessened, as mentioned above. An example of the above-mentioned program is, for example, a program used in a 4-bit microcomputer pps-4/1 manufactured by Rockwell International Corp. in U.S.A. The Single Circuit Microcomputer Series, Programming Manual (pps-4/1), by the same company describes a block diagram on p. 1-2 and a program for the arithmetic operation on p. 12-2.

The reason why the examples shown in FIGS. 1 and 2 need a more extensive program is as follows. The carry information in the arithmetic operation is stored in the flip-flop 13. For this, in the increment instruction (INL instruction) which is the contents of the L register 15, the flip-flop 13 must be used as a branch condition for branching from the program loop so that the carry information in the arithmetic operation must be held by the accumulator 6. Three instructions from address CAR-2, i.e. CLA instruction, to address CAR are necessary. The example in FIG. 3 solves such a problem. In the example of FIG. 3, the carry information relating to the L register 15 is not stored in the flip-flop 13 but is used for judgement as to whether the next instruction is to be skipped or not. That is, the information concerning the L register is stored in the SK flip-flop 41. In this way, the carry information in the ADC instruction in the case of pure arithmetic addition is stored in the flip-flop 13. Accordingly, even when the contents of the L register 15 is incremented, the carry information in the ADC instruction is not destroyed. As a consequence, superfluous instructions to save the carry information in the flip-flop 13 are unnecessary. In the example of FIG. 3, however, the processing function for the skip instruction is additionally used so that it needs an inhibition circuit for rendering inoperative the outputs of the SK flip-flop 41 and the instruction decoder 5. When it is necessary to judge whether the instruction to be skipped is a one-cycle instruction or a two-cycle instruction, it further requires a circuit for controlling the SK flip-flop 41 such as gates 43 and 44.

SUMMARY OF THE INVENTION

Accordingly, an object of the invention is to provide a data processor which is simplified in program and hardware, with provision of a flag register for storing carry information in an arithmetic operation and a flag register for testing a branch instruction.

To achieve the object, there is provided a data processor comprising: a first memory means for storing programs; an instruction decoding means which is coupled with said first memory means and decodes an instruction derived from said first memory means to produce a given control signal; a conditional circuit means which is coupled in receiving relation with said instruction decoding means and said first memory means, and produces an output signal for controlling said first memory means;

a second memory means for storing data;

a register means for holding addresses to define the locations in said second memory means;

an increment means for incrementing the contents of said register means;

arithmetic logic unit means which performs an operation on data outputted from said second memory means by an address held in said register means, under control of a control signal outputted from said instruction decoding means;

a first carry information storing means for storing carry information resulting from the operation by said arithmetic logic unit means and providing the output signal to said arithmetic logic unit means;

and a second carry information storing means which stores the carry information of said register means through the execution of said increment means and supplies the output signal to said conditional circuit.

DETAILED DESCRIPTION OF THE PREFERRED EMBODIMENT

Figure 4:
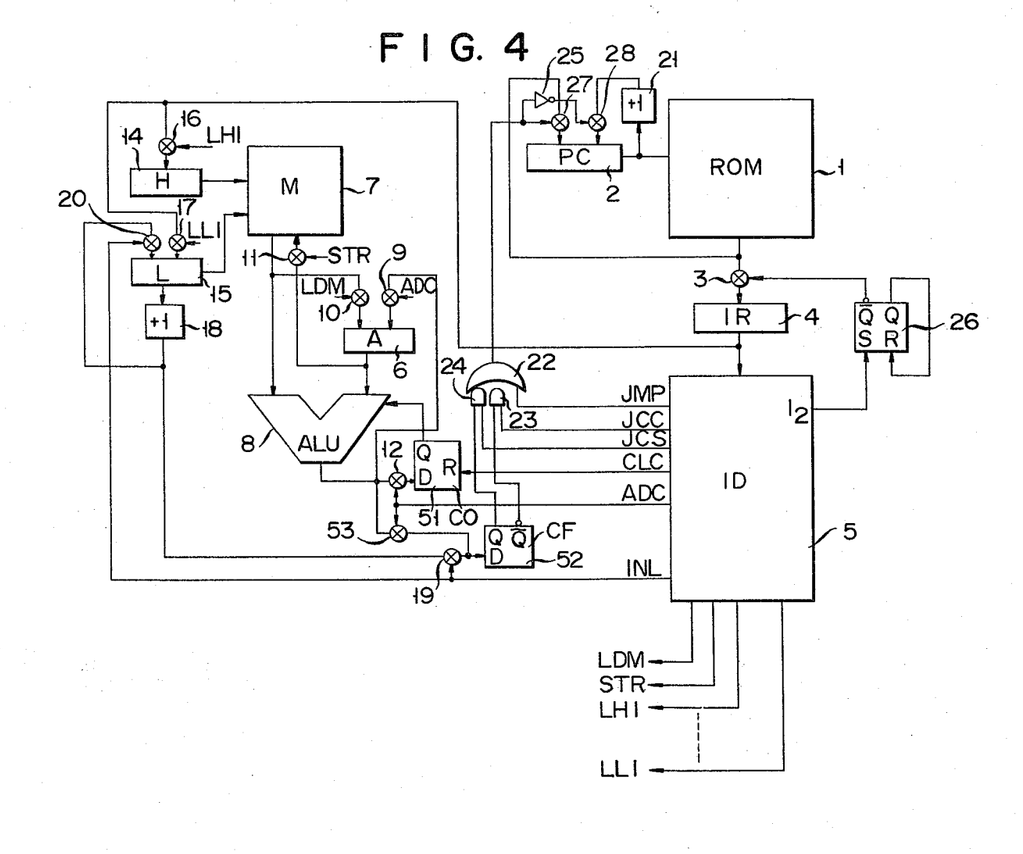
FIG. 4 shows a block diagram of an embodiment of a data processor according to the present invention.

Reference is first made to FIG. 4 illustrating an embodiment of a data processor according to the invention. In this embodiment, like numerals are used to designate like portion or parts in the examples shown in FIGS. 1 to 3. A notable feature in this example resides in the provision of a D type flip-flop (CO) 51 as a flag register for storing carry information which is exclusively used for the arithmetic operation, and a D type flip-flop (CF) 52 has a flag register for branch instruction judgement. The output signal from an arithmetic logic unit 8 is applied through a gate 12 to the D input terminal of flip-flop 51. The data held in the flip-flop 51 is returned from the Q terminal to the arithmetic logic unit 8. The flip-flop 51 may be reset by a CLC instruction from the instruction decoder 5. The output signal from the arithmetic and logic unit 8 is supplied through a gate 53 to the D terminal of the flip-flop 52 which is further supplied at the D terminal with the output signal, i.e. branch information, of an incrementer 18 for an L register 15, through a gate 19. Gates 53 and 12 are both enabled by an ADC instruction derived from an instruction decoder 5. A gate 19 is enabled by an INL instruction. The outputs Q and Q̄ of the flip-flop 52 are applied to gates 24 and 23 in the conditional circuit for selecting data stored in a program counter 2.

The CO flip-flop 51 is only for arithmetic operations stores carry information only when, in the arithmetic operation by the ADC instruction, for example, it is necessary to hold the carry information. The CF flip-flop 52 is used when a program is branched conditionally by carry information derived from the incrementer 18 for the L register 15. The carry information in all the operation instructions including the ADS instruction are stored through a gate 53 into the flip-flop 52. The reason for this is that, if the carry information is stored therein, it will come in useful for something in some cases.

A program for the data processor shown in FIG. 4 is given below.

The operation of the data processor by the program follows. The program counter 2 reads out the CLC instruction from the memory 1 into an instruction register 4 and the CLC instruction as read out and stored in the register 4 is then applied to the instruction decoder 5 where it is decoded. The ID 5 then produces a CLC control signal which in turn resets the CO flip-flop 51. Then, an LLI instruction is read out from the memory 1 and data in the address 8 is loaded into the L register 15 through gate 17 when it is enabled. An LHI instruction loads zero page data into the H register 14, and data in the address of the memory 7 specified by the registers 14 and 15 is loaded into the accumulator 6 by the LDM instruction. The LHI instruction provides data for specifying one page into the H register 14. At this time, the address 8 has already been specified by the L register 15, so that an ADC instruction performs an addition of the contents of the address 8 of the zero page to the contents of the address 8 of the one page. In this adding operation, if a carry occurs, "1" is loaded into the CO flip-flop 51. If no carry occurs, "0" is loaded into the same flip-flop. The contents of A+M which is the result of the operation is loaded into the accumulator 6. The succeeding STR instruction loads the result of the addition between the contents in the addresses 8 of the respective pages from the accumulator 6 into the address 8 of one page in memory 7. Then, an INL instruction increments by 1 the contents of the L register 15. As a result of this, if a carry occurs, "1" is loaded into the CF flip-flop 52. If no carry occurs, "0" is loaded thereinto. When "0" is stored in the flip-flop 52, the addition is not yet completed and the succeeding JCC instruction jumps the operation step to the address LOOP, with the result that the addition execution loop is repeated until a carry occurs in the contents of L+1. A carry occurs in the contents of L+1 when the contents of L is "1" in all the bits, that is to say, address 15. Accordingly, at this time the arithmetic addition operation is completed and the result of the addition has been loaded into the corresponding address of the one page in the memory 7.

The flip-flop 52 may also be used to compare the data of the accumulator 6 with the output data of the memory 7 and stores the result of the comparison.

As seen from the program operation mentioned above, carry information stored in the CF flip-flop 52 at the INL instruction never destroys the carry information by the arithmetic operation stored in the CO flip-flop 51. The number of instructions and words are small as in the FIG. 3 case and the hardware is simple thereby eliminating the need for the SK flip-flop 41, the inhibition circuit rendering the output of the instruction decoder 5 inoperative, and the gates 43 and 44 to control the flip-flop 41 which are required for the FIG. 3 example.

Figure 5:
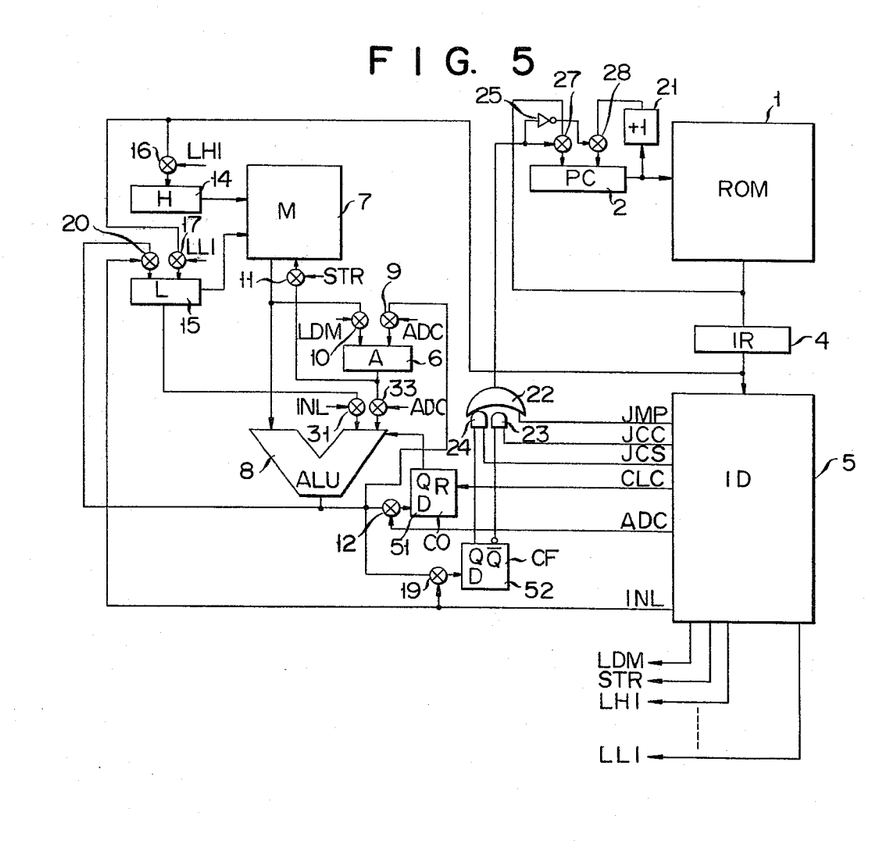
FIG. 5 shows a block diagram of another embodiment of a data processor according to the present invention.

Turing now to FIG. 5, there is shown another embodiment of the data processor according to the invention. This embodiment corresponds to the example of FIG. 2 in that the increment function by the INL instruction is executed by the arithmetic and logic unit 8. Further, it corresponds to the FIG. 4 example in that the flip-flop 51 for the operation alone and the flip-flop 52 for branch condition judgement are used. Therefore, like numerals are applied to the corresponding portions, for simplicity of explanation. In order that the branch information to be applied from the ALU 8 to the CF flip-flop 52 is supplied by the INL information, the output of the ALU 8 is coupled with the D terminal of the CF flip-flop 52 through the gate 19. When the output contents of the memory 7 is added to the contents of the accumulator 6, carry information from the flip-flop 51 is simultaneously added. For this, gate 8 and 33 are so connected to be enabled by the ADC instruction. In such an arithmetic operation, a branch information is not applied from the ALU 8 to the CF flip-flop 52 when the arithmetic operation ends at the addition of the contents of the address 14 of the zero page to the contents of the address 14 of the one page, for example, no carry occurs with $(L)+1=15$. Accordingly, in such a case, the ALU 8 compares the contents of the L register 15 with the immediate data transferred from the instruction register 4, and when they are coincident with each other, the branch information is loaded into the CF flip-flop 52. If such a construction is used, the arithmetic operable range is expandable.

The present invention is not limited to the embodiments mentioned above. For example, the D-type flip-flops 51 and 52 are used as flag registers may be replaced by other proper registers. When no multi-digit arithmetic operation is performed, the SK flip-flop in FIG. 3 can not be referred to by a program, but it may be referred to by the program with the CO flip-flop as a general one-bit flag.

What we claim is:

1. A data processor comprising:
   first memory means for addressably storing instructions in storage locations;
   instruction decoding means coupled with said first memory means for decoding instructions stored in said first memory means and for producing control signals responsive to the decoding of said instructions;
   conditional circuit means receiving said decoded instructions from said instruction decoding means for producing an output signal for controlling said first memory means;
   second memory means for addressably storing data in storage locations and for outputting said stored data in response to said control signal;
   register means for storing an address of a said storage location in said second memory means;
   means incrementing the address stored in said register means, said register means generating a first carry information signal when said incrementing means increments said address stored in said register means beyond the storage capacity of said register means;
   arithmetic logic unit means for performing arithmetic and logic operations on data stored in said storage location having said address (1) stored in said register means, and (2) outputted from said second memory means under the control of a said control signal produced by said instruction decoding means;
   first carry information storing means for storing said first carry information signal produced by said register means and for supplying said first carry information signal to said conditional circuit means; and
   second carry information storing means for storing said second carry information signal generated by a said arithmetic logic unit means and for providing said second carry information signal to said arithmetic logic unit means.

2. A data processor comprising:
   first memory means for storing instructions;
   instruction decoding means for decoding said instructions stored in said first memory means and for producing a control signal responsive to the decoding of each of said instructions;
   conditional circuit means for receiving said decoded instructions and for producing an output signal for controlling said first memory means;
   second memory means for addressably storing data in storage locations and for outputting said stored data in response to a said control signal;
   register means for storing an address of a said storage location in said second memory means;
   arithmetic logic unit means for performing, responsive to said control signals produced by said instruction decoding means, arithmetic and logic operations on data stored in said storage location addressed by said address in said second memory means stored in said register means, said arithmetic logic unit means for selectively producing a first carry information signal responsive to said arithmetic and logic operations and for incrementing said address stored in said register means, said register means for producing a second carry information signal responsive to said incrementing whenever the storage capacity of said register means is exceeded;
   a first carry information storing means for storing said first carry information signal and for providing said first carry information signal to said arithmetic logic means; and
   a second carry information storing means for storing said second carry information signal and for supplying said second carry information signal to said conditional circuit.

* * * * *